Dec. 12, 1950     E. F. LOWEKE     2,533,824
MASTER CYLINDER OF TELESCOPIC CONSTRUCTION
Filed April 10, 1947
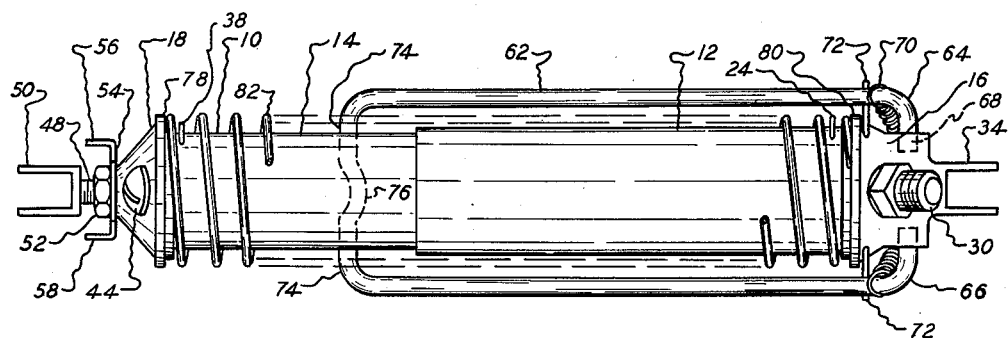
FIG. I.
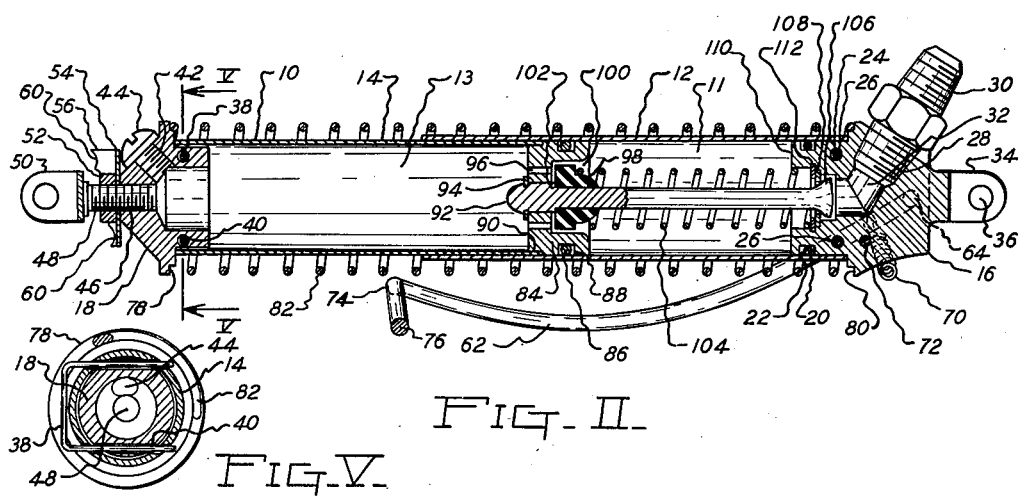
FIG. II.
FIG. V.
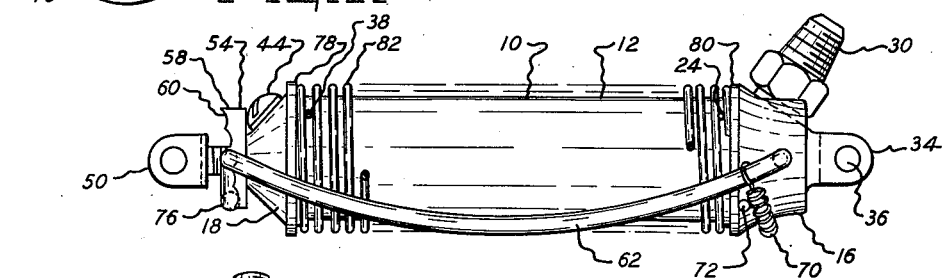
FIG. III.
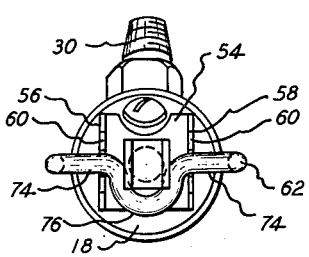
FIG. IV.
Inventor
ERWIN F. LOWEKE
By Bluman & Patch
Attorneys

UNITED STATES PATENT OFFICE 2,533,824

MASTER CYLINDER OF TELESCOPIC CONSTRUCTION

Erwin F. Loweke, Jackson, Mich., assignor, by mesne assignments, to The B. F. Goodrich Company, Akron, Ohio, a corporation of New York Application April 10, 1947, Serial No. 740,665

8 Claims. (Cl. 60—54.6)

This invention relates to master cylinders employed in fluid pressure systems, and more particularly to the master cylinders employed in aircraft brake systems in which hydraulic pressure is used to obtain a braking action.

At the present there are available several large master cylinders for use on large aircraft which are entirely satisfactory. However in the field of small light aircraft the ever present problem of lightening the structure without weakening it and at the same time manufacturing the individual part less expensively has led me to develop this present invention in master cylinders. At the present time the master cylinders available for use in construction for small airplanes are not entirely satisfactory, and are expensive to manufacture, the cheaper constructions having many faults and being regarded as not too dependable.

It is an object of this invention to provide a master cylinder for use on light private airplanes and small trainers in which the cost of production is very small and yet the quality of performance and dependability are materially increased over available products.

A further object is to provide a master cylinder for small aircraft which can be disassembled, serviced, and reassembled, without the use of special tools of any kind.

A still further object of my invention is to provide a brake master cylinder in which a parking device is employed in a new and novel manner.

A still further object is to provide a master cylinder in which the fluid reservoir is contained entirely within the cylinder.

Further objects and advantages of my invention will be apparent from a consideration of the following specification in connection with the appended claims and the accompanying drawing, in which, Fig. I is a top view showing my master cylinder in the extended position, Fig. II is a view in section showing the arrangement of the various parts, Fig. III is a view in elevation showing my cylinder in the compressed position, Fig. IV is an end view showing the engagement of the locking hook with the ratchet, and Fig. V is a detail view on line V—V of Fig. II showing the attachment means holding the end pieces in engagement with the cylindrical tube.

In the drawing the master cylinder 10 is shown as being composed primarily of two telescoping cylindrical tubes 12 and 14, the free ends of which are closed by end pieces or plugs 16 and 18, collectively defining the chambers 11 and 13. End piece 16 is sealed in the tube 12 by the seal ring 20 in the annular groove 22 in plug 16. Attachment of plug 16 to tube 12 is accomplished by the engagement of pins or attaching clips 24 through a pair of parallel apertures 26 and matching apertures in tube 12, the apertures 26 being formed as chords of the circular section of tube 12. From this it can be seen that the disassembly of the end piece 16 from the tube 12 may be accomplished by merely removing the attachment pin 24 and slipping plug 16 out of tube 12. The end piece 16 is formed with a suitable aperture 28 formed to receive a fitting 30 which is in turn to be fastened to the pressure side of the hydraulic system. The aperture 28 connects with a passage 32 thereby allowing fluid within the cylinder 10 to pass through the passage 32 and the aperture 28 and into the hydraulic system. An attachment yoke 34 with suitable attachment holes 36 is formed as a projection on the end of plug 16.

The end piece 18 is not in sealed relationship with the tube 14, but is held in attached relationship with tube 14 by means of the engagement of attaching pins 38 in the apertures 40, which apertures are again formed as chords of the circular section of tube 14, being cut through the tube and through the end piece 18. It will in fact be noticed that in Fig. II there is an apparent space between end piece 18 and tube 14, which space is used for bleeding off excess pressure when wide extremes of temperature cause expansion and contraction of the fluid.

The aperture 42 is cut completely through the plug 18 and is adapted to be used as a filling port for the introduction of fluid to the inside of the tube 14; it is closed by the cap screw 44. The aperture 46 is on the axis of the cylinder, and is fitted to receive the threaded attachment screw 48 and the attachment yoke 50. Removably received on the attachment portion 48 and held in position by the lock nut 52 is a catch 54, comprising a pair of parallel sides 56 and 58 formed with a plurality of teeth or detents 60.

Formed to engage detents 60 in the catch 54 is the parking hook 62 which, through most of its length, I have formed in a catenary curve to provide a relatively stiff resilience. The parking hook 62 is formed roughly in a U-shape, with the upper ends of the U being bent inward to form attaching arms 64 and 66 which engage apertures 68 in the plug 16. Arms 64 and 66 hold a light coil spring 70 which tends to hold hook 62 in the position shown in Fig. II and out of engagement with the ratchet 54, as well as in engagement with the pin 72 which limits its downward travel. The closed end of the U-shaped hook 62 is formed with a double reversed curve, giving a pair of straight sections 74 and a curved section 76 intermediate the sections 74. The sections 74 engage with detents 60 in the catch 54, while the curved section 76 bypasses the attachment portion 48, thereby allowing straight portions 74 to engage the upper, more distant detents 60 in the catch 54. It should now be clearly understood that the locking portion 62 engages the ratchet 54 only when the tube 14 is fully telescoped within the tube 12, or nearly so, and for the purpose of holding tube 14 in telescoped relationship with tube 12.

In engagement with the annular shoulder 78 on portion 18 and with the annular shoulder 80 on end portion 16, is the outer coil spring 82, positioned to hold the tubes 12 and 14 in extended relationship.

Fitted in position for reciprocating movement within the tube 12 is a piston head 84, sealed in the tube 12 by the oil ring 86 in the annular groove 88. The upper end of the piston head 84 is formed with an annular groove 90 into which tube 14 seats to move piston head 84. The piston rod 92, which carries an external snap ring 94 to function as a limiter to the outward travel of piston head 84, is received through piston head 84. Open ports 96 are provided in piston head 84 to allow the passage of fluid between the two chambers 11 and 13 when the ports 96 are not closed by the seal ring 98 which is carried in the recess 100 and urged against piston head 84 or the annular shoulder 102 by action of coil spring 104. The end of the piston rod 92 adjacent passage 32 is coined, as at 106, and is held in position by the engagement of the washer 108 with an internal snap ring 110 which is fitted into the annular groove 112 and which also serves as a seat for the spring 104. This mounting at one end of the piston rod 92 allows the rest of the rod to float freely within the chamber 11 when the piston head 84 is pressed down toward the end portion 16.

In operation the attachment yoke 34 is secured to a solid portion of the airplane structure, while the attachment yoke 50 is secured to the rudder pedal. When the rudder pedal is depressed to apply the brake, pressure is transmitted through the attachment yoke 50, and the inner tube 14, to the piston head 84, moving piston head 84 to the right, in Fig. II. The initial movement of piston head 84 will close the ports 96 as piston head 84 moves up to the annular shoulder 102 on the piston rod 92. Having closed all means of escape for the enclosed liquid excepting the passage 32 into the hydraulic system, the piston head 84 moves through its stroke pushing the liquid past the coined end 106 of piston rod 92 and into the passage 32, which pressure is used to obtain the braking action. It will be noticed at this time that chamber 13 has not been subjected to any fluid pressure but rather, the tube 14 has acted as part of the piston in moving the fluid, while chamber 13 has acted as a fluid reservoir. With the tubes in the compressed position, if it is desired to lock the brakes for parking the airplane, parking hook 62 is moved by suitable cables or linkage so that straight portions 74 engage teeth or detents 60 in the ratchet 54, thereby holding the brakes in the "locked" or "on" position. If it is desired to release the brakes, the pedals may be slightly depressed, thereby removing the tension from the parking hook 62, at which time the spring 70 will disengage parking hook 62 from ratchet 54, which will allow the inner tube 14 and piston head 84 to move back out of outer tube 12, the sealing ring 98 being released from closing engagement with the ports 96 near the end of the stroke when the sealing ring 98 strikes the annular shoulder 102, as the piston head is carried back by the engagement of the tube 14 in the annular groove 90, the tube 14 being urged by the spring 82.

Servicing this hydraulic cylinder is relatively simple, and may be done with a minimum of ordinary tools. The bolts attaching the attachment yokes 34 and 50 to the airplane may be removed, and the hydraulic line removed from the fitting 30, thereby allowing the cylinder to be removed from the airplane. The end portions 16 and 18 may be removed by pulling the attachment pins 24 and 38 from the attachment holes 26 and 40. This will break the assembly down into four large pieces, and if further disassembly of the piston rod and piston head portion is contemplated, a small screw driver or other small tool may be used to remove the two snap rings 94 and 110 which hold that assembly together. The assembling of the master cylinder is equally as simple.

Fluid may be added to the hydraulic system through the aperture 42, it being suggested that chamber 13 be maintained at all times about half full of fluid, to provide a reserve sufficient for normal operation. Expansion and contraction of the hydraulic fluid and air contained in the system will not be harmful due to the presence of the ports 96 and the venting arrangement found in the loose engagement of end portion 18 with the inner tube 14. It should also be appreciated that the locking mechanism provided is extremely simple and yet very positive in its locking action.

By combining the fluid reservoir with the piston, I have eliminated many parts formerly felt necessary in hydraulic systems. This has resulted in a considerable saving in cost and weight as well as providing an extremely simple easily serviced structure.

Having described my invention what I desire to claim as new and protect by Letters Patent is:

1. A master cylinder for fluid pressure systems comprising a pair of telescopic tubes, an end piece mounted in each of said tubes, attachment means associated with one of said end pieces for connecting said tubes to a fluid pressure system, a catch associated with one of said end pieces, an external spring associated with said tubes and said end pieces urging said end pieces away from each other, and a parking member pivotally mounted in one of said end pieces and fitted to engage said catch on the other of said end pieces to hold said tubes in their telescoped position.

2. A master cylinder for a brake system, said cylinder comprising an outer tube, a piston head in sealed engagement interior to said outer tube, an inner tube telescopically received within said outer tube and in actuating relationship with said piston head each said tube being constituted by a plain severed length of tubing of uniform cross section throughout its length, a separately formed end closure member connected to the outer end of each tube, a parking member pivotally mounted on one of said tubes and adapted for releasable engagement with the other of said tubes to maintain said tubes in compressed telescoped relationship, an outer spring adapted to urge said tubes into extended telescoped relationship, a plurality of selectively sealable ports in said piston head to permit fluid passage when said inner tube is completely extended from said outer tube, and interior guide means adapted to guide said piston head for its reciprocating movement.

3. A master cylinder for a fluid pressure operated brake sytem, said cylinder comprising a pair of tubes of uniform cross-section throughout their extent telescopically fitting each other, the innermost of said tubes providing a fluid supply cylinder and the outermost providing a fluid pressure cylinder, an end member sealed and detachably secured to the pressure cylinder tube and having a fluid connection to the brake system, a second end member detachably secured to the supply cylinder tube and provided with a filling opening, a compression coil spring encompassing said tubes and seated on said end members, a piston fitting said fluid pressure cylinder and seated at the end of said supply cylinder, said piston having an opening therethrough connecting said pressure and supply cylinders, valve means anchored to the first said end member within said pressure cylinder and including a valve and spring means urging said valve against said piston to close the opening of said piston during a power stroke thereof, and means on said end members for forcing them towards each other against the resistance of said compression coil spring.

4. A master cylinder for a fluid pressure system, said cylinder comprising a pair of open-ended tubes severed from simple tube lengths of uniform cross-section throughout their length, said tubes telescopically fitting each other in co-axial aligned relationship, separately formed end members connected to the outer tube ends to close the latter except for openings in said end members which are adapted to provide a fluid inlet at one end to its corresponding tube interior and a fluid outlet at the opposite end from its corresponding tube interior, said end members having abutment surfaces, a coil spring encompassing said aligned telescoped tubes with its thrust taken upon said abutment surfaces, a separately formed piston mounted in the outermost tube and having a fluid passage therethrough adapted to permit a flow of fluid between the tube interiors in one direction of piston movement, and valve means operatively connected with said piston and adapted to close said fluid passage in the opposite direction of piston movement.

5. A master cylinder for a fluid pressure system, said cylinder comprising a pair of simple open-ended tubes of uniform cross-section throughout their length telescopically fitting each other in co-axial aligned relationship, separately formed end members connected to the outer tube ends to close the latter except for openings in said end members which are adapted to provide a fluid inlet at one end to its corresponding tube interior and a fluid outlet at the opposite end from its corresponding tube interior, said end members having abutment surfaces, a coil spring encompassing said aligned telescoped tubes with its thrust taken upon said abutment surfaces, a separately formed piston mounted in the outermost tube and having a fluid passage therethrough adapted to permit a flow of fluid between the tube interiors in one direction of piston movement, valve means operatively connected with said piston and adapted to close said fluid passage in the opposite direction of piston movement, and releasable connecting means on said tubes adapted to permit of the latter being held connected together against telescopic movement and against the resistance of said coil spring to afford a parked condition of the master cylinder.

6. A master cylinder for a fluid pressure system, said cylinder comprising a pair of simple open-ended tubes of uniform cross-section throughout their length telescopically fitting each other in co-axial aligned relationship, the innermost tube providing a fluid supply cylinder and the outermost tube providing a fluid pressure cylinder, separately formed end members connected to the outer tube ends to close the latter except for openings in said end members which are adapted to provide a fluid inlet to the said supply cylinder and a fluid outlet from the said pressure cylinder, said end members having abutment surfaces, a coil spring encompassing said aligned telescoped tubes with its thrust taken upon said abutment surfaces, a separately formed piston mounted in the outermost tube and having a fluid passage therethrough for permitting a flow of fluid between the tube interiors in one direction of piston movement, the inner end of said supply cylinder having abutting engagement with said piston to actuate the latter in its fluid pressure applying movement in the opposite direction of piston movement, and valve means operatively connected with said piston and adapted to close said fluid passage in the fluid pressure applying piston movement.

7. A master cylinder for a fluid pressure system, said cylinder comprising a pair of simple open-ended tubes of uniform cross-section throughout their length telescopically fitting each other in co-axial aligned relationship, the innermost tube providing a fluid supply cylinder and the outermost tube providing a fluid pressure cylinder, separately formed end members connected to the outer tube ends to close the latter except for openings in said end members which are adapted to provide a fluid inlet to said supply cylinder and a fluid outlet from said pressure cylinder, exterior abutment surfaces on said tubes, a coil spring encompassing said aligned telescoped tubes with its thrust taken upon said abutment surfaces, a separately formed piston mounted in the outermost tube and having a fluid passage therethrough for permitting a flow of fluid between the tube interiors in one direction of piston movement, the inner end of said supply cylinder having abutting engagement with said piston to actuate the latter in its fluid pressure applying movement in the opposite direction of piston movement, and valve means operatively connected with said piston and adapted to close said fluid passage in the fluid pressure applying piston movement.

8. A master cylinder for a fluid pressure system, said cylinder comprising a pair of simple open-ended tubes of uniform cross-section throughout their length telescopically fitting each other in co-axial aligned relationship, the innermost tube providing a fluid supply cylinder and the outermost tube providing a fluid pressure cylinder, separately formed end members connected to the outer tube ends to close the latter except for openings in said end members which are adapted to provide a fluid inlet to said supply cylinder and a fluid outlet from said pressure cylinder, exterior abutment surfaces on said tubes, a coil spring encompassing said aligned telescoped tubes with its thrust taken upon said abutment surfaces, a separately formed piston mounted in the outermost tube and having a fluid passage therethrough for permitting a flow of fluid between the tube interiors in one direction of piston movement, the inner end of said supply cylinder having abutting engagement with said piston to actuate the latter in its fluid pressure applying movement in the opposite direction of piston movement, and valve means operatively connected with said piston and releasable connecting means on said tubes adapted to permit of the latter being held connected together against telescopic movement and against the resistance of said coil spring to afford a parking condition of the master cylinder.

ERWIN F. LOWEKE.

REFERENCES CITED

The following references are of record in the file of this patent:

UNITED STATES PATENTS

| Number | Name | Date |
|---|---|---|
| 1,915,701 | Thomas | June 27, 1930 |
| 2,120,073 | Majneri | June 7, 1938 |
| 2,192,012 | La Brie | Feb. 27, 1940 |
| 2,276,853 | Majneri | Mar. 17, 1942 |
| 2,293,854 | Sauzedde | Aug. 25, 1942 |
| 2,335,748 | Fowler | Nov. 30, 1943 |

OTHER REFERENCES

Ser. No. 396,779, Morton. (A. P. C.), published April 20, 1943.